G. W. N. Yost,
Mower.

No. 15096.  Patented June 10 1856

UNITED STATES PATENT OFFICE.

GEORGE W. N. YOST, OF PITTSBURG, PENNSYLVANIA.

IMPROVEMENT IN REAPING AND MOWING MACHINES.

Specification forming part of Letters Patent No. 15,096, dated June 10, 1856.

*To all whom it may concern:*

Be it known that I, GEORGE W. N. YOST, of Pittsburg, county of Allegheny, State of Pennsylvania, have invented a new and useful Improvement in Reaping and Mowing Machines, of which the following is a full, clear, and sufficient description, reference being had to the accompanying drawings.

Figure 2:
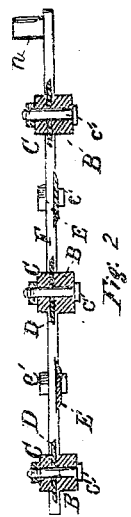
Figure 3:
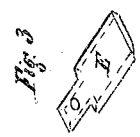
Figure 1:
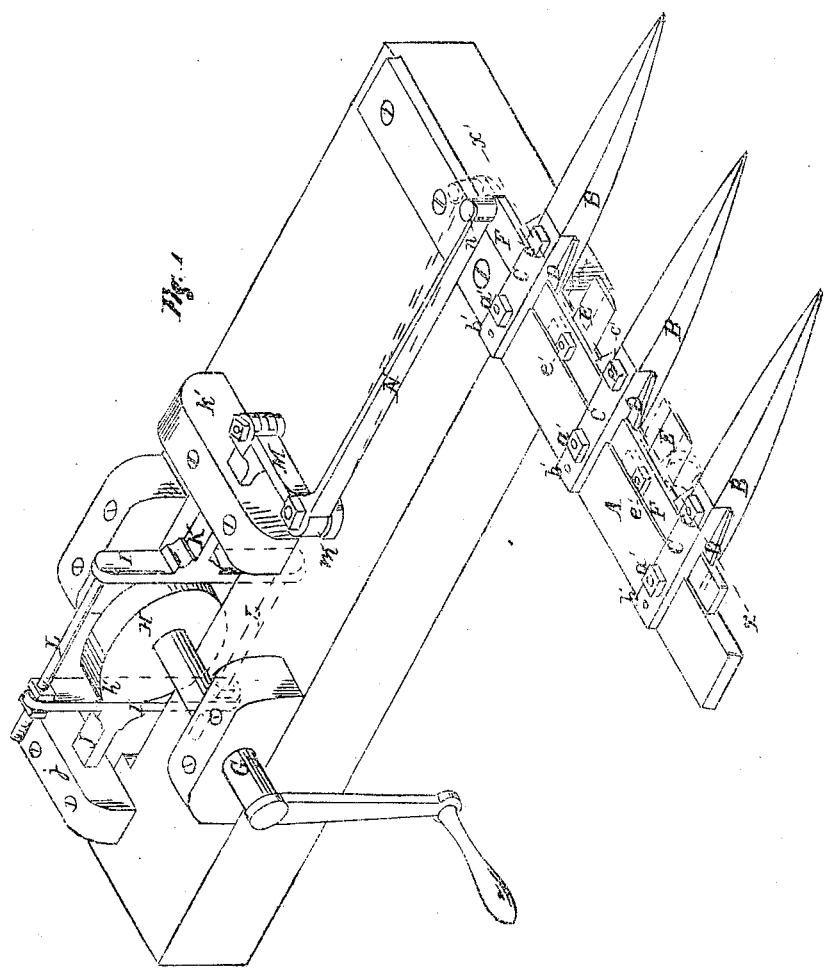

Figure 1 is a perspective view of the cutting mechanism and of the parts for operating the cutter-bar; Fig. 2, a vertical section through the line *x x'* in Fig. 1, and Fig. 3 a view of one of the movable cutters detached.

The nature of my improvement consists in a new mode of constructing and operating the cutting mechanism of a reaping and mowing machine, so as to combine the advantages of a shear and chopping stroke, which has not heretofore been successfully applied to this purpose.

The finger-bar A, attached to the main frame in any suitable manner, carries the fingers B, whose shanks, running under the finger-bar and caps C overlying it, are both at once fastened thereto by bolts, the screw ends of which receive nuts above the caps, as shown at *a'*, both shank and cap being at the same t me prevented from turning on the said screw by a pin, *b'*, projecting, both above and below the finger-bar, through holes in said shank and cap. These are still further united by the bolt and nut *c'*, which at the same time holds the stationary cutters D, whose opposite edges diverge as they run back, (see Fig. 1,) and are also beveled on the upper side, as more clearly seen in Fig. 2. The movable cutters C, which are beveled on the under side and act against the lower edge and side of these latter, have a beveled shank or tenon, (see Fig. 3,) which is introduced into a beveled mortise in the cutter-bar F, as seen in section in Fig. 2, and is fastened in place by the bolt and nut *e'*. Thus when any cutter becomes dull, either by continued use or by accident, it can be immediately detached and another substituted therefor. The cutter E is of peculiar construction. The front end or point is square and blunt, the sides straight and sharp. This kind of a cutter I regard as necessary in order to produce the result aimed at. If the sides of the cutter were not straight, there would be great liability of the grain being pushed away from the action of cutters by their sudden movement.

The shaft G, receiving motion from the driving-wheel in any suitable manner, bears a cam, H, nearly circular, but projecting suddenly at *h'* to act alternately and abruptly upon the opposite sides of the cam-yoke I, which is supported by its two arms, J and K, sliding in the blocks *j'* and *k'*. The two sides of this yoke are connected by screw-rods L, furnished with double nuts, by which their distance can be regulated and the yoke adjusted, if necessary, to any wearing of the cam. The forward end of the arm K is pivoted to a bent lever, M N, fulcrumed upon the frame at *m'*, and bolted loosely to the cutter-bar at *n'*, as shown in the drawings. The long arm N of this bent lever is made of steel, slightly elastic, not sufficiently so to yield to the resistance of the grain in the ordinary operation of the cutters, but so that when a stone or other such obstacle stops them the strain may be taken from the driving-gear and its connections and be borne by this spring until said obstacle is removed. This action of the spring is shown by red lines in Fig. 1.

It will be seen that after the projection *h'* on the cam H makes one passage of the horizontal line through the center of the cam, having carried the yoke and at the same time the cutters to one extreme of their stroke, it revolves without touching the yoke until it acts against the other side, when the yoke, and consequently the cutters, are suddenly carried in the opposite direction. Thus the cutters E at each end of the stroke remain for a time stationary, and when moved traverse the space between the fingers, partly cutting the grain intervening and partly pushing it toward the stationary cutters D, against which it chops it off with what may be called a "shear and chop blow."

It will also be noticed that as the cutter E is not carried within the bounds of the finger the stroke necessary to be given to the cutter-bar is—the distance of the fingers being the same—less at each end by the semi-width of the finger, or by the width of the finger in all, thus economizing the power employed to operate it.

Having thus described my improvement, I do not claim giving an abrupt and intermittent reciprocating motion to the cutter-bar of grain and grass harvesters; but

What I claim as of my own invention, and desire to secure by Letters Patent, is—

The above-described operating mechanism, or its equivalent, to produce an abrupt and intermittent reciprocating motion, in combination with the inclined-edged cutters D and the straight-edged cutters E, whereby I obtain the shear and chop blow, substantially as and for the purpose above set forth.

In testimony whereof I have hereunto subscribed my name.

GEO. W. N. YOST.

In presence of—
JOHN S. HOLLINGSHEAD,
WM. CHAUNCY LANGDON.